(12) United States Patent
Mei et al.

(10) Patent No.: US 12,143,458 B2
(45) Date of Patent: Nov. 12, 2024

(54) METHOD AND APPARATUS FOR SELECTING INFORMATION PUSHED-TO TERMINAL

(71) Applicant: Huawei Device Co., Ltd., Guangdong (CN)

(72) Inventors: Jingqing Mei, Shenzhen (CN); Zhihao Jin, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

(21) Appl. No.: 17/733,189

(22) Filed: Apr. 29, 2022

(65) Prior Publication Data

US 2022/0256008 A1 Aug. 11, 2022

Related U.S. Application Data

(63) Continuation of application No. 17/125,193, filed on Dec. 17, 2020, now Pat. No. 11,356,523, which is a
(Continued)

(51) Int. Cl.
*H04L 29/08* (2006.01)
*H04L 12/18* (2006.01)
*H04L 51/04* (2022.01)
*H04L 67/30* (2022.01)
*H04L 67/55* (2022.01)
*H04M 1/72412* (2021.01)
(Continued)

(52) U.S. Cl.
CPC .......... *H04L 67/55* (2022.05); *H04L 12/1859* (2013.01); *H04L 51/04* (2013.01); *H04L 67/30* (2013.01); *H04M 1/72412* (2021.01); *H04W 4/12* (2013.01); *H04W 4/80* (2018.02); *H04M 1/72484* (2021.01)

(58) Field of Classification Search
CPC .................. H04L 67/26; H04L 12/18
USPC ...................................................... 709/206
See application file for complete search history.

(56) References Cited

U.S. PATENT DOCUMENTS 7,043,278 B2  5/2006  Valade et al.
7,715,873 B1*  5/2010  Biere .................... H04M 19/04
                                                     455/418
(Continued)

FOREIGN PATENT DOCUMENTS

CN   1386030 A   12/2002
CN   1429364 A    7/2003
(Continued)

*Primary Examiner* — Glenford J Madamba
(74) *Attorney, Agent, or Firm* — Conley Rose, P.C.

(57) ABSTRACT

A method for selecting an information pushed-to terminal, includes determining, by a first terminal, a service type of received service information according to a preset terminal service type table, acquiring, by the first terminal from a terminal status table configured in the first terminal, characteristic information of second terminals connected to the first terminal, determining working statuses of the second terminals according to the characteristic information, selecting, by the first terminal from the second terminals according to a preset information push rule, the service type of the service information and the working statuses of the second terminals, a target terminal of information push, and sending a prompt message of having received the service information to the target terminal.

17 Claims, 3 Drawing Sheets

Related U.S. Application Data continuation of application No. 16/289,147, filed on Feb. 28, 2019, now Pat. No. 10,897,513, which is a continuation of application No. 15/035,341, filed as application No. PCT/CN2013/087658 on Nov. 22, 2013, now Pat. No. 10,250,707.

(51) Int. Cl.
*H04W 4/12* (2009.01)
*H04W 4/80* (2018.01)
H04M 1/72484 (2021.01)

(56) References Cited

U.S. PATENT DOCUMENTS

| | | | |
|---|---|---|---|
| 9,088,624 | B2 | 7/2015 | Grigoriev |
| 2002/0107041 | A1 | 8/2002 | Mori |
| 2002/0168990 | A1 | 11/2002 | Valade et al. |
| 2005/0272408 | A1 | 12/2005 | Wilkes-Gibbs et al. |
| 2011/0059769 | A1 | 3/2011 | Brunolli |
| 2015/0061862 | A1 | 3/2015 | Lee et al. |
| 2016/0251339 | A1 | 9/2016 | Zhang et al. |
| 2016/0277891 | A1 * | 9/2016 | Dvortsov ................ H04W 4/12 |
| 2021/0345058 | A1 | 11/2021 | Itakura et al. |

FOREIGN PATENT DOCUMENTS

| | | | |
|---|---|---|---|
| CN | 101060720 | A | 10/2007 |
| CN | 102075891 | A | 5/2011 |
| CN | 103313216 | A | 9/2013 |
| CN | 103347306 | A | 10/2013 |
| JP | 2002027142 | A | 1/2002 |
| JP | 2002163178 | A | 6/2002 |
| JP | 2002232956 | A | 8/2002 |
| JP | 2002369260 | A | 12/2002 |
| JP | 2006279586 | A * | 10/2006 |
| JP | 2007173920 | A * | 7/2007 |
| JP | 2008104102 | A | 5/2008 |
| JP | 2011109285 | A | 6/2011 |
| JP | 2016537910 | A | 12/2016 |
| JP | 2016540786 | A | 12/2016 |
| JP | 2020053791 | A | 4/2020 |
| WO | 0169387 | A1 | 9/2001 |
| WO | 2014206194 | A1 | 12/2014 |
| WO | 2015034163 | A1 | 3/2015 |

* cited by examiner

METHOD AND APPARATUS FOR SELECTING INFORMATION PUSHED-TO TERMINAL

CROSS-REFERENCE TO RELATED APPLICATION

This is a continuation of U.S. patent application Ser. No. 17/125,193 filed on Dec. 17, 2020, which is a continuation of U.S. patent application Ser. No. 16/289,147 filed on Feb. 28, 2019, now U.S. Pat. No. 10,897,513, which is a continuation of U.S. patent application Ser. No. 15/035,341 filed on May 9, 2016, now U.S. Pat. No. 10,250,707, which is a U.S. National Stage of International Patent Application No. PCT/CN2013/087658 filed on Nov. 22, 2013. All of the aforementioned applications are hereby incorporated by reference in their entireties.

TECHNICAL FIELD

The present disclosure relates to the field of communications technologies, and in particular, to a method and an apparatus for selecting an information pushed-to terminal.

BACKGROUND

Currently, there are increasingly various wearable devices, and wearable devices such as head mounted displays, GOOGLE GLASS, smart watches, heart rate monitors, and smart shoes gradually enter people's life. A wearable device may be connected to a mobile phone in a short distance, and may further receive information sent by the mobile phone. When receiving new information, the mobile phone may push prompt information of having received the information to the wearable device connected to the mobile phone, or may push the received information to the wearable device.

In a case in which only one wearable device is connected to a mobile phone, if the mobile phone receives new service information (such as a new short message service (SMS) message or a new incoming call), the mobile phone may send prompt information of having received the new service information to the wearable device, and prompt, in a manner such as vibration, a ringtone, or flashes of the wearable device, a user to view the received service information. However, if multiple wearable devices such as glasses, a watch, and shoes are connected to a mobile phone, when the mobile phone receives new service information, to which device should prompt information of having received the service information be sent, or which device is in a working status more suitable for receiving the prompt information? A problem of selecting an information pushed-to terminal cannot be resolved, information push efficiency and utilization of a device resource cannot be ensured, and a user experience effect of information push cannot be ensured.

SUMMARY

Embodiments of the present disclosure provide a method and an apparatus for selecting an information pushed-to terminal such that a target terminal of information push can be selected from multiple second terminals connected to a first terminal, which can improve information push efficiency, improve utilization of a terminal resource, and improve user experience of information push.

A first aspect of the embodiments of the present disclosure provides a method for selecting an information pushed-to terminal, where the method may include determining, by a first terminal, a service type of received service information according to a preset terminal service type table, acquiring, by the first terminal from a terminal status table configured in the first terminal, characteristic information of second terminals connected to the first terminal, and determining working statuses of the second terminals according to the characteristic information, selecting, by the first terminal from the second terminals according to a preset information push rule, the service type of the service information and the working statuses of the second terminals, a target terminal of information push, where the target terminal supports the service information, and a working status of the target terminal meets a requirement for pushing the service information, and sending a prompt message of having received the service information to the target terminal.

With reference to the first aspect, in a first possible implementation manner, the received service information includes at least one of voice or video call service information, an SMS message, an e-mail, instant messaging information, and a push notification.

With reference to the first aspect or the first possible implementation manner of the first aspect, in a second possible implementation manner, before determining, by a first terminal, a service type of received service information according to a preset terminal service type table, the method includes presetting the terminal service type table, where the terminal service type table includes terminal service information, a terminal service type, and a correspondence between the terminal service information and the terminal service type, where the terminal service information includes at least one of a voice or video call service, an SMS message, an e-mail, instant messaging information, a game, a video, and navigation, and the terminal service type includes at least one of a realtime communication type, a non-realtime communication type, and a realtime non-communication type.

With reference to any one of the first aspect to the second possible implementation manner of the first aspect, in a third possible implementation manner, the characteristic information of the second terminals includes at least one of configuration information and the working statuses of the second terminals, where the configuration information includes at least one of a device identifier, a device type, and a manner of communication with the first terminal, and a running status of the second terminals includes an interaction state or a non-interaction state.

With reference to the third possible implementation manner of the first aspect, in a fourth possible implementation manner, before acquiring, by the first terminal from a terminal status table configured in the first terminal, characteristic information of second terminals connected to the first terminal, the method further includes acquiring the configuration information of the second terminals connected to the first terminal, acquiring communication data of the second terminals, and determining the running statuses of the second terminals and service types of the second terminals according to the communication data, and generating the terminal status table based on the configuration information, the running statuses, and the service types of the second terminals, and storing the terminal status table in a designated location.

With reference to the fourth possible implementation manner of the first aspect, in a fifth possible implementation manner, acquiring communication data of the second terminals, and determining the running statuses of the second terminals and service types of the second terminals according to the communication data includes determining whether there is data input or output on data input or output channels of the second terminals, and if it is determined that there is data input or output on a second terminal, determining that the second terminal is in the interaction state, and determining, according to acquired communication data, a type of a service running on the second terminal, or if it is determined that there is no data input or output on a second terminal, determining that the second terminal is in the non-interaction state, where the data input or output channel includes at least one of data input or output channels of voice, an image, touch, and vibration.

With reference to the fifth possible implementation manner of the first aspect, in a sixth possible implementation manner, the information push rule is preferentially processing a service of a communication type, and a working status of the second terminal includes the running status of the second terminal and the service type of the second terminal, and selecting, by the first terminal from the second terminals according to a preset information push rule, the service type of the service information and the working statuses of the second terminals, a target terminal of information push includes, if the service type of the service information is the communication type that includes a realtime communication type and a non-realtime communication type, setting a second terminal in the interaction state as a most preferred target terminal, and setting a second terminal in the non-interaction state as a second preferred target terminal, and determining whether the most preferred target terminal is empty, and selecting one terminal from the most preferred target terminal as the target terminal of information push if a result of the determining is not empty, or selecting one terminal from the second preferred target terminal as the target terminal of information push if a result of the determining is empty.

With reference to the fifth possible implementation manner of the first aspect, in a seventh possible implementation manner, the information push rule is preferentially processing a service of a non-communication type, and a working status of the second terminal includes the running status of the second terminal and the service type of the second terminal, and selecting, by the first terminal from the second terminals according to a preset information push rule, the service type of the service information and the working statuses of the second terminals, a target terminal of information push includes, if the service type of the service information is a communication type that includes a realtime communication type and a non-realtime communication type, setting a second terminal that is in the interaction state and whose service type is a communication type as a most preferred target terminal, setting a second terminal in the non-interaction state as a second preferred target terminal, and setting a second terminal that is in the interaction state and whose service type is a non-communication type as a third preferred target terminal, and determining whether the most preferred target terminal is empty, and selecting one terminal from the most preferred target terminal as the target terminal of information push if the most preferred target terminal is not empty, or determining whether the second preferred target terminal is empty if the most preferred target terminal is empty, and selecting one terminal from the second preferred target terminal as the target terminal of information push if a result of the determining is not empty, or selecting one terminal from the third preferred target terminal as the target terminal of information push if a result of the determining is empty.

With reference to the sixth possible implementation manner of the first aspect or the seventh possible implementation manner of the first aspect, in an eighth possible implementation manner, selecting, according to the service type of the service information and service types and configuration information of the second terminals, one terminal from the multiple second terminals as the target terminal of information push if the most preferred target terminal includes multiple second terminals, selecting, according to configuration information of the second terminals, one terminal from the multiple second terminals as the information pushed-to terminal if the second preferred target terminal includes multiple second terminals, or selecting, according to configuration information of the second terminals, one terminal from the multiple third terminals as the information pushed-to terminal if the third preferred target terminal includes multiple second terminals.

With reference to the eighth possible implementation manner of the first aspect, in a ninth possible implementation manner, selecting, according to the service type of the service information and service types and configuration information of the second terminals, one terminal from the multiple second terminals as the target terminal of information push includes determining, according to a service type of each second terminal of the multiple second terminals, whether services running on the second terminals include a service that is the same as the service information, and selecting a second terminal on which the service runs, as the target terminal of information push if a result of the determining is that the services running on the second terminals include a service that is the same as the service information, and selecting, according to configuration information of the second terminals, one second terminal from the multiple second terminals as the target terminal of information push if there are multiple second terminals on which the service runs, or determining whether the service type of the second terminal includes a service type that is the same as the service type of the service information if a result of the determining is that the services running on the second terminals do not include a service that is same as the service information, selecting a second terminal corresponding to the service type as the target terminal of information push if the service type of the second terminal includes a service type that is the same as the service type of the service information, and selecting, according to configuration information of the second terminals, one second terminal from the multiple second terminals as the target terminal of information push if there are multiple second terminals corresponding to the service type.

A second aspect of the embodiments of the present disclosure provides an apparatus for selecting an information pushed-to terminal, and the apparatus may include a processing module configured to determine a service type of received service information according to a preset terminal service type table, an acquiring module configured to acquire, from a configured terminal status table, characteristic information of second terminals connected to the first terminal, where the processing module is configured to determine working statuses of the second terminals according to the characteristic information acquired by the acquiring module, a selecting module configured to select, from the second terminals according to a preset information push rule, the service type of the service information and the working statuses of the second terminals, a target terminal of information push, where the target terminal supports the service information, and a working status of the target terminal meets a requirement for pushing the service information, and a sending module configured to send a prompt message of having received the service information to the target terminal.

With reference to the second aspect, in a first possible implementation manner, the service information received by the processing module includes at least one of voice or video call service information, an SMS message, an e-mail, instant messaging information, and a push notification.

With reference to the second aspect or the first possible implementation manner of the second aspect, in a second possible implementation manner, the apparatus further includes a setting module configured to preset the terminal service type table, where the terminal service type table includes terminal service information, a terminal service type, and a correspondence between the terminal service information and the terminal service type, where the terminal service information includes at least one of a voice or video call service, an SMS message, an email, instant messaging information, a game, a video, and navigation, and the terminal service type includes at least one of a realtime communication type, a non-realtime communication type, and a realtime non-communication type.

With reference to any one of the second aspect to the second possible implementation manner of the second aspect, in a third possible implementation manner, the characteristic information of the second terminals acquired by the acquiring module includes at least one of configuration information and the working statuses of the second terminals, where the configuration information includes at least one of a device identifier, a device type, and a manner of communication with the first terminal, and a running status of the second terminals includes an interaction state or a non-interaction state.

With reference to the third possible implementation manner of the second aspect, in a fourth possible implementation manner, the acquiring module is further configured to acquire the configuration information of the second terminals connected to the first terminal, and the processing module is further configured to acquire communication data of the second terminals, determine the running statuses of the second terminals and service types of the second terminals according to the communication data, generate the terminal status table based on the configuration information, the running statuses, and the service types of the second terminals, and store the terminal status table in a designated location.

With reference to the fourth possible implementation manner of the second aspect, in a fifth possible implementation manner, the processing module is further configured to determine whether there is data input or output on data input or output channels of the second terminals, and if it is determined that there is data input or output on a second terminal, determine that the second terminal is in the interaction state, and determine, according to acquired communication data, a type of a service running on the second terminal, or if it is determined that there is no data input or output on a second terminal, determine that the second terminal is in the non-interaction state, where the data input or output channel includes at least one of data input or output channels of voice, an image, touch, and vibration.

With reference to the fifth possible implementation manner of the second aspect, in a sixth possible implementation manner, the information push rule is preferentially processing a service of a communication type, and a working status of the second terminal includes the running status of the second terminal and the service type of the second terminal, and the selecting module is further configured to, if the service type of the service information is the communication type that includes a realtime communication type and a non-realtime communication type, set a second terminal in the interaction state as a most preferred target terminal, and set a second terminal in the non-interaction state as a second preferred target terminal, and determine whether the most preferred target terminal is empty, and select one terminal from the most preferred target terminal as the target terminal of information push if a result of the determining is not empty, or select one terminal from the second preferred target terminal as the target terminal of information push if a result of the determining is empty.

With reference to the fifth possible implementation manner of the second aspect, in a seventh possible implementation manner, the information push rule is preferentially processing a service of a non-communication type, and a working status of the second terminal includes the running status of the second terminal and the service type of the second terminal, and the selecting module is further configured to, if the service type of the service information is a communication type that includes a realtime communication type and a non-realtime communication type, set a second terminal that is in the interaction state and whose service type is a communication type as a most preferred target terminal, set a second terminal in the non-interaction state as a second preferred target terminal, and set a second terminal that is in the interaction state and whose service type is a non-communication type as a third preferred target terminal, and determine whether the most preferred target terminal is empty, and select one terminal from the most preferred target terminal as the target terminal of information push if the most preferred target terminal is not empty, or determine whether the second preferred target terminal is empty if the most preferred target terminal is empty, and select one terminal from the second preferred target terminal as the target terminal of information push if a result of the determining is not empty, or select one terminal from the third preferred target terminal as the target terminal of information push if a result of the determining is empty.

With reference to the sixth possible implementation manner of the second aspect or the seventh possible implementation manner of the second aspect, in an eighth possible implementation manner, the selecting module is further configured to select, according to the service type of the service information and service types and configuration information of the second terminals, one terminal from the multiple second terminals as the target terminal of information push if the most preferred target terminal includes multiple second terminals, select, according to configuration information of the second terminals, one terminal from the multiple second terminals as the target terminal of information push if the second preferred target terminal includes multiple second terminals, or select, according to configuration information of the third terminals, one terminal from the multiple third terminals as the target terminal of information push if the third preferred target terminal includes multiple second terminals.

With reference to the eighth possible implementation manner of the second aspect, in a ninth possible implementation manner, when selecting, according to the service type of the service information and the service types and the configuration information of the second terminals, one terminal from the multiple second terminals as the target terminal of information push, the selecting module is further configured to determine, according to a service type of each second terminal of the multiple second terminals, whether services running on the second terminals include a service that is the same as the service information, and select a second terminal on which the service runs, as the target terminal of information push if a result of the determining is that the services running on the second terminals include a service that is the same as the service information, and select, according to configuration information of the second terminals, one second terminal from the multiple second terminals as the target terminal of information push if there are multiple second terminals on which the service runs, or determine whether the service type of the second terminal includes a service type that is the same as the service type of the service information if a result of the determining is that the services running on the second terminals do not include a service that is the same as the service information, select a second terminal corresponding to the service type as the target terminal of information push if the service type of the second terminal includes a service type that is the same as the service type of the service information, and select, according to configuration information of the second terminals, one second terminal from the multiple second terminals as the target terminal of information push if there are multiple second terminals corresponding to the service type.

A third aspect of the embodiments of the present disclosure provides a terminal, and the terminal may include a receiver configured to receive service information, a processor configured to determine, according to a preset terminal service type table, a service type of the service information received by the receiver, acquire, from a configured terminal status table, characteristic information of second terminals connected to the terminal, and determine working statuses of the second terminals according to the characteristic information. The processor is further configured to select, from the second terminals according to a preset information push rule, the service type of the service information and the working statuses of the second terminals, a target terminal of information push, where the target terminal supports the service information, and a working status of the target terminal meets a requirement for pushing the service information, and a transmitter configured to send a prompt message of having received the service information to the target terminal selected by the processor.

With reference to the third aspect, in a first possible implementation manner, the service information received by the receiver includes at least one of voice or video call service information, an SMS message, an e-mail, instant messaging information, and a push notification.

With reference to the third aspect or the first possible implementation manner of the third aspect, in a second possible implementation manner, the processor is further configured to preset the terminal service type table, where the terminal service type table includes terminal service information, a terminal service type, and a correspondence between the terminal service information and the terminal service type, where the terminal service information includes at least one of a voice or video call service, an SMS message, an e-mail, instant messaging information, a game, a video, and navigation, and the terminal service type includes at least one of a realtime communication type, a non-realtime communication type, and a realtime non-communication type.

With reference to any one of the third aspect to the second possible implementation manner of the third aspect, in a third possible implementation manner, the characteristic information of the second terminals includes at least one of configuration information and the working statuses of the second terminals, where the configuration information includes at least one of a device identifier, a device type, and a manner of communication with the first terminal, and a running status of the second terminals includes an interaction state or a non-interaction state.

With reference to the third possible implementation manner of the third aspect, in a fourth possible implementation manner, the processor is further configured to acquire the configuration information of the second terminals connected to the terminal, acquire communication data of the second terminals, and determine the running statuses of the second terminals and service types of the second terminals according to the communication data, and generate the terminal status table based on the configuration information, the running statuses, and the service types of the second terminals, and store the terminal status table in a designated location.

With reference to the fourth possible implementation manner of the third aspect, in a fifth possible implementation manner, when acquiring the communication data of the second terminals, and determining the running statuses of the second terminals and the service types of the second terminals according to the communication data, the processor is further configured to determine whether there is data input or output on data input or output channels of the second terminals, and if it is determined that there is data input or output on a second terminal, determine that the second terminal is in the interaction state, and determine, according to acquired communication data, a type of a service running on the second terminal, or if it is determined that there is no data input or output on a second terminal, determine that the second terminal is in the non-interaction state, where the data input or output channel includes at least one of data input or output channels of voice, an image, touch, and vibration.

With reference to the fifth possible implementation manner of the third aspect, in a sixth possible implementation manner, the information push rule is preferentially processing a service of a communication type, and a working status of the second terminal includes the running status of the second terminal and the service type of the second terminal, and when selecting, from the second terminals according to the preset information push rule, the service type of the service information and the working statuses of the second terminals, the target terminal of information push, the processor is further configured to, if the service type of the service information is the communication type that includes a realtime communication type and a non-realtime communication type, set a second terminal in the interaction state as a most preferred target terminal, and set a second terminal in the non-interaction state as a second preferred target terminal, and determine whether the most preferred target terminal is empty, and if a result of the determining is not empty, select one terminal from the most preferred target terminal as the target terminal of information push, or if a result of the determining is empty, select one terminal from the second preferred target terminal as the target terminal of information push.

With reference to the fifth possible implementation manner of the third aspect, in a seventh possible implementation manner, the information push rule is preferentially processing a service of a non-communication type, and a working status of the second terminal includes the running status of the second terminal and the service type of the second terminal, and when selecting, from the second terminals according to the preset information push rule, the service type of the service information and the working statuses of the second terminals, the target terminal of information push, the processor is further configured to, if the service type of the service information is a communication type that includes a realtime communication type and a non-realtime communication type, set a second terminal that is in the interaction state and whose service type is a communication type as a most preferred target terminal, set a second terminal in the non-interaction state as a second preferred target terminal, and set a second terminal that is in the interaction state and whose service type is a non-communication type as a third preferred target terminal, and determine whether the most preferred target terminal is empty, and if the most preferred target terminal is not empty, select one terminal from the most preferred target terminal as the target terminal of information push, or determine whether the second preferred target terminal is empty if the most preferred target terminal is empty, and select one terminal from the second preferred target terminal as the target terminal of information push if a result of the determining is not empty, or select one terminal from the third preferred target terminal as the target terminal of information push if a result of the determining is empty.

With reference to the sixth possible implementation manner of the third aspect or the seventh possible implementation manner of the third aspect, in an eighth possible implementation manner, the processor is further configured to select, according to the service type of the service information and service types and configuration information of the second terminals, one terminal from the multiple second terminals as the target terminal of information push if the most preferred target terminal includes multiple second terminals, select, according to configuration information of the second terminals, one terminal from the multiple second terminals as the target terminal of information push if the second preferred target terminal includes multiple second terminals, or select, according to configuration information of the third terminals, one terminal from the multiple third terminals as the target terminal of information push if the third preferred target terminal includes multiple second terminals.

With reference to the eighth possible implementation manner of the third aspect, in a ninth possible implementation manner, when selecting, according to the service type of the service information and the service types and the configuration information of the second terminals, one terminal from the multiple second terminals as the target terminal of information push, the processor is further configured to determine, according to a service type of each second terminal of the multiple second terminals, whether services running on the second terminals include a service that is the same as the service information, and select a second terminal on which the service runs, as the target terminal of information push if a result of the determining is that the services running on the second terminals include a service that is the same as the service information, and select, according to configuration information of the second terminals, one second terminal from the multiple second terminals as the target terminal of information push if there are multiple second terminals on which the service runs, or determine whether the service type of the second terminal includes a service type that is the same as the service type of the service information if a result of the determining is that the services running on the second terminals do not include a service that is the same as the service information, select a second terminal corresponding to the service type as the target terminal of information push if the service type of the second terminal includes a service type that is the same as the service type of the service information, and select, according to configuration information of the second terminals, one second terminal from the multiple second terminals as the target terminal of information push if there are multiple second terminals corresponding to the service type.

In the embodiments of the present disclosure, according to a service type of service information of a first terminal and working statuses of multiple second terminals connected to the first terminal, one second terminal may be selected from the multiple second terminals as an information pushed-to terminal, which can ensure information push efficiency, can further take specific situations of the multiple second terminals into full account, and can improve utilization of a terminal resource. The information pushed-to terminal is selected according to the specific situations of the second terminals such that prompt information of service information is pushed to the information pushed-to terminal, which can improve user experience of information push.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
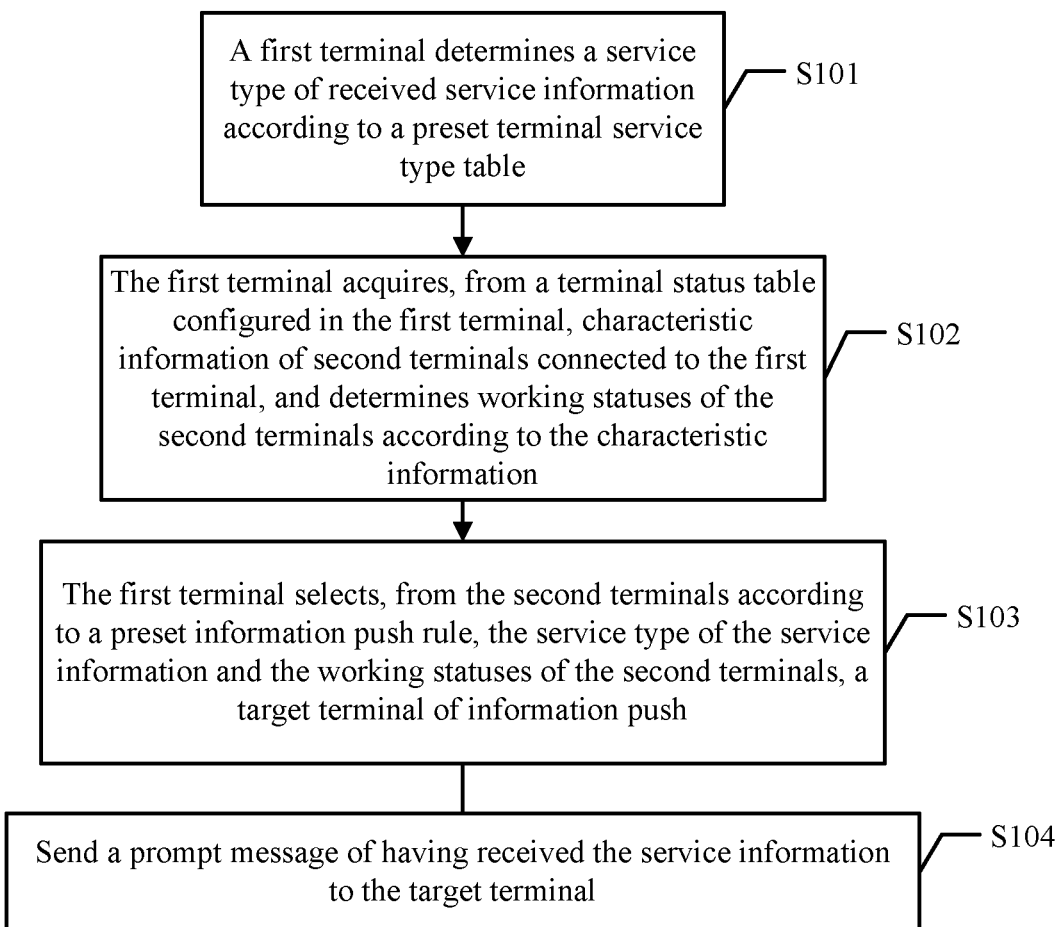
FIG. 1 is a schematic flowchart of an embodiment of a method for selecting an information pushed-to terminal according to an embodiment of the present disclosure.

Referring to FIG. 1, FIG. 1 is a schematic flowchart of an embodiment of a method for selecting an information pushed-to terminal according to an embodiment of the present disclosure. The method for selecting an information pushed-to terminal in this embodiment includes the following steps.

Step S101: A first terminal determines a service type of received service information according to a preset terminal service type table.

During specific implementation, the first terminal described in this embodiment of the present disclosure may be a mobile phone, a tablet computer, or the like. The foregoing first terminal is merely exemplary rather than exhaustive. The following uses a mobile phone as an example for specific description of the method for selecting an information pushed-to terminal in this embodiment.

In some feasible implementation manners, the service information that is received by the mobile phone and described in this embodiment of the present disclosure may include voice or video call service information, an SMS message, an e-mail, instant messaging information, a push notification, and the like. The foregoing service information is merely exemplary rather than exhaustive. During specific implementation, the terminal service type table may be preset on the mobile phone before the mobile phone receives the service information, where the terminal service type table may include terminal service information, a terminal service type, and a correspondence between the terminal service information and the terminal service type. The foregoing terminal may be the first terminal described in this embodiment of the present disclosure or a second terminal, the foregoing terminal service information may include a voice or video call service, an SMS message, an email, instant messaging information, a game, a video, navigation, and the like, and the foregoing terminal service type may include a realtime communication type, a non-realtime communication type, a realtime non-communication type, and the like. Furthermore, the correspondence between the terminal service information and the terminal service type may further be preset. For example, a voice or video call service is corresponding to the realtime communication type (that is, the voice or video call service may belong to the realtime communication type), an SMS message, an email, and instant messaging information are corresponding to the non-realtime communication type, and a game and a video (such as a movie) are corresponding to the realtime non-communication type. In addition, a terminal service type corresponding to other service information, such as a terminal service type corresponding to navigation may further be included.

During specific implementation, after the terminal service type table is set, when receiving the service information, the mobile phone may perform matching between the received service information and a service type in the foregoing terminal service type table to determine a service type corresponding to the received service information. After determining the service type of the received service information, the mobile phone may select, according to the service type of the service information and service types of wearable devices connected to the mobile phone, a target terminal of information push (an information pushed-to terminal for short) in order to send prompt information of having received the service information to the terminal, where the foregoing target terminal of information push supports the service information received by the mobile phone, and a working status of the target terminal meets a requirement for pushing the service information.

Step S102: The first terminal acquires, from a terminal status table configured in the first terminal, characteristic information of second terminals connected to the first terminal, and determines working statuses of the second terminals according to the characteristic information.

During specific implementation, a second terminal described in this embodiment of the present disclosure may be a wearable device such as a head mounted display, GOOGLE GLASS, a smart watch, or smart shoes. The foregoing second terminal is merely exemplary rather than exhaustive.

In some feasible implementation manners, the characteristic information of the wearable devices (that is, the second terminals) in this embodiment may include configuration information, the working statuses, and the like of the wearable devices, where the foregoing configuration information may include a device identifier, a device type, a manner of communication with the mobile phone, and the like, for example, an identification code of a wearable device, a device type of a wearable device (including a device model, data transmission efficiency of a device, a service type that can be supported by a device, and the like), and a manner of communication (such as BLUETOOTH transmission) between a wearable device and a mobile phone. A running status of the foregoing wearable device may include an interaction state or a non-interaction state. Furthermore, the foregoing interaction state may be classified into an active interaction state and a passive interaction state, where the active interaction state means that there is continuous data input on one or more data channels of a device, for example, a user continuously inputs data to one or more data channels of a device, such as voice, an image, or touch, and the passive interaction state means that there is continuous data output on one or more data channels of the device, for example, there is no input operation of the user, but the device outputs data to one or more data channels of the device, such as voice, an image, or touch. The non-interaction state means that there is no data input or output on a data channel of the user.

During specific implementation, when any wearable device (such as a smart watch) establishes a connection with the mobile phone, the mobile phone may acquire configuration information of the smart watch, including an identifier, a device type, and the like of the smart watch. After the smart watch establishes a connection with the mobile phone, the mobile phone may detect a communication status of the smart watch in real time, may acquire communication data of the smart watch in real time, and determines, according to the acquired communication data, a running status and a service type of the smart watch. Furthermore, it may be determined, according to a data channel of the smart watch, whether there is data input or output on a data input or output channel of the smart watch, and if it is determined that there is data input or output on one or more data channels of the smart watch, it may be determined that the smart watch is in the interaction state, that is, the smart watch currently interacts with a user of the mobile phone, or if it is determined that there is no data input or output on the data channel of the smart watch, it may be determined that the smart watch is currently in the non-interaction state, that is, the smart watch may be currently in a standby state. In addition, when the smart watch is in the interaction state, a type of a service currently running on the smart watch, for example, reading an SMS message or instant messaging information or playing a video, may further be determined according to the acquired communication data. The foregoing data channel (including the data input channel and the data output channel) may include an input channel and an output channel of data or a signal, such as voice, an image, touch, or vibration.

During specific implementation, after acquiring the configuration information of the wearable devices connected to the mobile phone and determining the running statuses of the wearable devices and the service types of the wearable devices, the mobile phone may generate the terminal status table based on the configuration information, the running statuses, and the service types of the wearable devices, and store the terminal status table in a designated location. After receiving the service information and determining the service type of the service information, the mobile phone may select, according to the characteristic information of the wearable devices stored in the terminal status table, a corresponding wearable device as the information pushed-to terminal, and push the prompt information of having received the service information to the device.

Step S103: The first terminal selects, from the second terminals according to a preset information push rule, the service type of the service information and the working statuses of the second terminals, a target terminal of information push.

Step S104: Send a prompt message of having received the service information to the target terminal.

In some feasible implementation manners, after receiving the service information, when the mobile phone needs to send the prompt information to the wearable device connected to the mobile phone, the mobile phone needs to select, according to a new service type and the characteristic information of the wearable devices stored in the terminal status table, a corresponding wearable device as the target terminal of information push (the information pushed-to terminal for short). During specific implementation, the information push rule may be preset such that the target terminal is selected according to the rule and the service information or the service types of the wearable devices. During specific implementation, service types of a mobile phone and service types of a wearable device may be classified into a communication type and a non-communication type. When the preset device information push rule is preferentially processing a service of a communication type (communication preferred for short, for example, the user is currently waiting for a call or an SMS message), if the service type of the service information received by the mobile phone is the communication type that includes a realtime communication type and a non-realtime communication type, a wearable device in the interaction state may be set as a most preferred target terminal, and a wearable device in the non-interaction state may be set as a second preferred target terminal, that is, the wearable device in the interaction state may be preferentially selected as the information pushed-to terminal. In this case, the wearable device in the interaction state may receive, at any time, the prompt information of the service information, and therefore, it takes a relatively short time to display the prompt information of the new service, and a user experience effect is good. If the wearable device is in the non-interaction state (such as the standby state), the device still needs to be started before the information is sent to the device, and therefore, it takes a relatively long time to display, on the device, the prompt information of the service information sent to the device, and the user experience effect is relatively poor. Furthermore, if the foregoing most preferred target terminal is not empty (that is, one or more devices of the wearable devices connected to the mobile phone are interacting with the user), one wearable device may be selected, from these wearable devices that meet the condition, as the target terminal of information push. If the foregoing most preferred target terminal is empty (that is, none of the wearable devices connected to the mobile phone is interacting with the user), one terminal may be selected from the second preferred target terminal as the target terminal of information push.

In addition, if the preset information push rule is preferentially processing a service of a non-communication type (communication not preferred for short, for example, the user is currently at rest and does not want to be disturbed by a communication service such as a call or an SMS message), when the service type of the service information received by the mobile phone is a communication type that includes a realtime communication type and a non-realtime communication type, a wearable device that is in the interaction state and whose service type is a communication type (that is, the same as the service type of the service information) may be set as a most preferred target terminal, a wearable device in the non-interaction state may be set as a second preferred target terminal, and a wearable device that is in the interaction state and whose service type is a non-communication type (such as a device on which a video is being played) may be set as a third preferred target terminal. That is, the wearable device that is in the interaction state and whose service type is the same as the service type of the service information may be preferentially selected from a terminal type as the information pushed-to terminal such that the prompt information of the information service information is promptly pushed to the terminal, and other experience of the user is not affected. If there is no device that is among the wearable devices currently connected to the mobile phone and in the interaction state and whose service type is the communication type, the mobile phone may choose to send the prompt information of the service information to the wearable device in the non-interaction state. The current information push rule is communication not preferred. Therefore, the user may be watching a video or playing a game at the moment (the device is currently in the interaction state), and does not want to be disturbed. If the foregoing two types of devices are not included in the wearable devices connected to the mobile phone, the mobile phone then sends the prompt information of the service information to the wearable device that is in the interaction state and whose service type is the non-communication type.

During specific implementation, after receiving the service information, when selecting the information pushed-to terminal from multiple wearable devices connected to the mobile phone, the mobile phone may first filter out, according to the configuration information of the wearable devices connected to the mobile phone, a wearable device that does not support the service information received by the mobile phone, and select, from a wearable device that supports the service information, a wearable device that meets the requirement for pushing the service information. That is, the foregoing most preferred target terminal, second preferred target terminal, and third preferred target terminal are wearable devices that can support the service information received by the mobile phone.

During specific implementation, if the foregoing most preferred target terminal includes multiple wearable devices, when the information pushed-to terminal is being selected from the multiple wearable devices, one terminal may be selected as the information pushed-to terminal from the multiple wearable devices according to the service type of the service information and service types and configuration information of the wearable devices. If the foregoing second preferred target terminal includes multiple wearable devices, when the information pushed-to terminal is being selected from the multiple wearable devices, one device may be selected as the information pushed-to terminal from the multiple wearable devices according to configuration information of the wearable devices. If the foregoing third preferred target terminal includes multiple wearable devices, one device may be selected as the information pushed-to terminal from the multiple wearable devices according to configuration information of the wearable devices, where the foregoing configuration information mainly refers to the following: a device model of the wearable device, data transmission efficiency of the wearable device, whether a manner of communication between the wearable device and the mobile phone enables the prompt information of the service information to be sent or received more promptly and more efficiently, or the like. If there is more than one most preferred wearable device, when the information pushed-to terminal is being selected from more than one most preferred wearable device, a wearable device on which a service the same as the service information runs may also be preferentially selected from the multiple wearable devices according to the service type of the service information, and the wearable device on which the service runs is selected as the information pushed-to terminal. In addition, if there is more than one wearable device that meets the condition, the information pushed-to terminal is selected from the more than one wearable device according to configuration information of the wearable devices. If there is no service that is the same as the service information, a wearable device whose service type is the same as the service type of the service information may be selected from the multiple wearable devices as the information pushed-to terminal. In addition, if there is more than one wearable device that meets the condition, the information pushed-to terminal may be selected from the more than one wearable device according to configuration information of the devices.

In some feasible implementation manners, after the information pushed-to terminal is selected according to the foregoing method, the prompt information of having received the service information by the mobile phone may be sent to the terminal to prompt the user of the mobile phone to promptly view the received service information. Furthermore, the user may be prompted, in a prompt manner such as a flash of glasses, a ringtone of a watch, or vibration of smart shoes, to promptly view the information. The foregoing prompt manner is merely distance rather than exhaustive, and a prompt manner includes but is not limited to the foregoing manner.

In this embodiment of the present disclosure, one wearable device may be selected as a target terminal of information push from wearable devices according to a service type of service information received by a mobile phone, configuration information of the wearable devices connected to the mobile phone, and working statuses of the wearable devices, prompt information of having received the service information is sent to the wearable device, and a user of the mobile phone is notified, in a prompt manner such as a flash, a ringtone, or vibration of the wearable device, to promptly view the service information, which can improve information push efficiency, improve utilization of the wearable device, ensure timeliness of reading the service information, and improve a user experience effect of information push.

Figure 2:
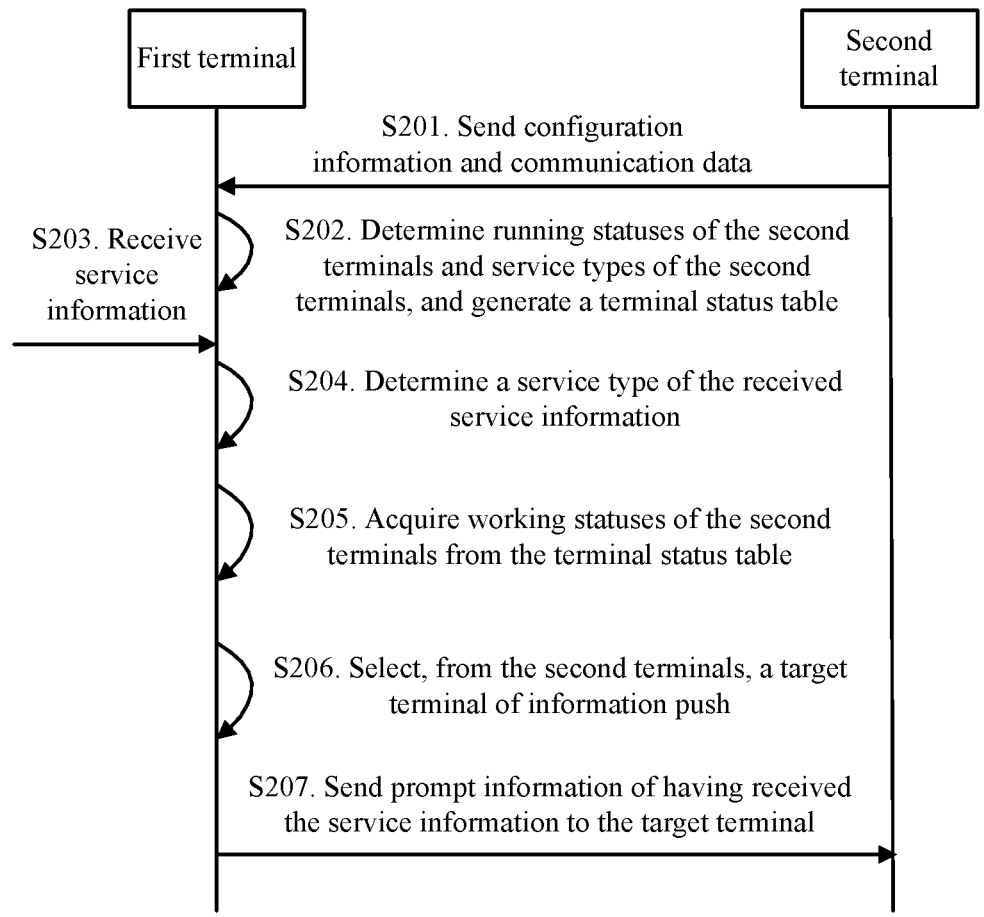
FIG. 2 is a schematic interaction diagram of a method for selecting an information pushed-to terminal according to an embodiment of the present disclosure.

Referring to FIG. 2, FIG. 2 is a schematic interaction diagram of a method for selecting an information pushed-to terminal according to an embodiment of the present disclosure. As shown in FIG. 2, the method in this embodiment of the present disclosure includes the following steps.

Step S201: A second terminal sends configuration information and communication data of the second terminal to a first terminal, where the second terminal is connected to the first terminal.

Step S202: The first terminal determines, according to communication data of second terminals connected to the first terminal, running statuses of the second terminals and service types of the second terminals, generates a terminal status table based on configuration information, the running statuses, and the service types of the second terminals, and stores the terminal status table in a designated location.

During specific implementation, the first terminal described in this embodiment of the present disclosure may be a mobile phone, a tablet computer, or the like. The foregoing first terminal is merely exemplary rather than exhaustive. The following uses a mobile phone as an example for specific description of the method for selecting an information pushed-to terminal in this embodiment. The second terminal described in this embodiment of the present disclosure may be a wearable device such as a head mounted display, GOOGLE GLASS, a smart watch, or smart shoes. The foregoing second terminal is merely exemplary rather than exhaustive.

In some feasible implementation manners, the configuration information of the wearable devices in this embodiment (that is, the second terminals) may include a device identifier, a device type, a manner of communication with the mobile phone, and the like, for example an identification code of a wearable device, a device type of a wearable device (including a device model, data transmission efficiency of a device, a service type that can be supported by a device, and the like), and a manner of communication (such as BLUETOOTH transmission) between a wearable device and a mobile phone. A running status of the foregoing wearable device may include an interaction state or a non-interaction state. The foregoing interaction state may be classified into an active interaction state and a passive interaction state, where the active interaction state means that there is continuous data input on one or more data channels of a device, for example, a user continuously inputs data to one or more data channels of a device, such as voice, an image, or touch, and the passive interaction state means that there is continuous data output on one or more data channels of the device, for example, there is no input operation of the user, but the device outputs data to one or more data channels of the device, such as voice, an image, or touch. The non-interaction state means that there is no data input or output on a data channel of the user.

During specific implementation, when any wearable device (such as a smart watch) establishes a connection with the mobile phone, the wearable device may send characteristic information of the wearable device to the mobile phone, and the mobile phone may acquire configuration information of the smart watch, including an identifier, a device type, and the like of the smart watch. After the smart watch establishes a connection with the mobile phone, the mobile phone may further detect a communication status of the smart watch in real time, may acquire communication data of the smart watch in real time (that is, the smartphone may send the communication data of the smart watch to the mobile phone in real time), and determines, according to the acquired communication data, a running status and a service type of the smart watch. Further, it may be determined, according to a data channel of the smart watch, whether there is data input or output on a data input or output channel of the smart watch, and if it is determined that there is data input or output on one or more data channels of the smart watch, it may be determined that the smart watch is in the interaction state, that is, the smart watch currently interacts with a user of the mobile phone, or if it is determined that there is no data input or output on the data channel of the smart watch, it may be determined that the smart watch is currently in the non-interaction state, that is, the smart watch may be currently in a standby state. In addition, when it is determined that the smart watch is in the interaction state, a type of a service currently running on the smart watch, for example, reading an SMS message or instant messaging information or playing a video, may further be determined according to the acquired communication data. The foregoing data channel (including the data input channel and the data output channel) may include an input channel and an output channel of data or a signal, such as voice, an image, touch, or vibration.

During specific implementation, after acquiring the configuration information of the wearable devices connected to the mobile phone and determining the running statuses of the wearable devices and the service types of the wearable devices, the mobile phone may generate the terminal status table based on the configuration information, the running statuses, and the service types of the wearable devices, and store the terminal status table in the designated location. In addition, when the interaction state or the service type of the wearable device changes, the wearable device may send the communication data of the wearable device to the mobile phone in real time in order to update a new working status of the wearable device to the mobile phone in real time, and the mobile phone may update, according to data obtained by means of updating by the wearable device, the terminal status table configured in the mobile phone such that more accurate working statuses of the wearable devices connected to the mobile phone are recorded in the terminal status table.

Step S203: The first terminal receives service information.

Step S204: The first terminal determines a service type of the received service information according to a preset terminal service type table.

In some feasible implementation manners, the service information that is received by the mobile phone and described in this embodiment of the present disclosure may include voice or video call service information, an SMS message, an e-mail, instant messaging information, a push notification, and the like. The foregoing service information is merely exemplary rather than exhaustive. During specific implementation, the terminal service type table may be preset on the mobile phone before the mobile phone receives the service information, where the terminal service type table may include terminal service information, a terminal service type, and a correspondence between the terminal service information and the terminal service type. The foregoing terminal may be the first terminal described in this embodiment of the present disclosure or the second terminal, the foregoing terminal service information may include a voice or video call service, an SMS message, an e-mail, instant messaging information, a game, a video, navigation, and the like, and the foregoing terminal service type may include a realtime communication type, a non-realtime communication type, a realtime non-communication type, and the like. The correspondence between the terminal service information and the terminal service type may further be preset. For example, a voice or video call service is corresponding to the realtime communication type (that is, the voice or video call service may belong to the realtime communication type), an SMS message, an e-mail, and instant messaging information are corresponding to the non-realtime communication type, and a game and a video (such as a movie) are corresponding to the realtime non-communication type. In addition, a terminal service type corresponding to other service information, such as a terminal service type corresponding to navigation may further be included.

During specific implementation, after the terminal service type table is set, when receiving the service information, the mobile phone may perform matching between the received service information and a service type in the foregoing terminal service type table to determine a service type corresponding to the received service information. After determining the service type of the received service information, the mobile phone may select, according to the service type of the service information and the service types of the wearable devices connected to the mobile phone, a target terminal of information push (an information pushed-to terminal for short) in order to send prompt information of having received the service information to the terminal, where the foregoing target terminal of information push supports the service information received by the mobile phone, and a working status of the target terminal meets a requirement for pushing the service information.

Step S205: The first terminal acquires working statuses of the second terminals from the terminal status table.

Step S206: The first terminal selects, from the second terminals according to a preset information push rule, the service type of the service information and the working statuses of the second terminals, a target terminal of information push.

Step S207: The first terminal sends prompt information of having received the service information to the target terminal.

In some feasible implementation manners, after receiving the service information and determining the service type of the service information, the mobile phone may select, according to characteristic information of the wearable devices stored in the terminal status table, a corresponding wearable device as the information pushed-to terminal, and push the prompt information of having received the service information to the device.

During specific implementation, after receiving the service information, when it is required to send the prompt information to the wearable device connected to the mobile phone, the mobile phone needs to select, according to a new service type and the characteristic information that is of the wearable device and stored in the terminal status table, a corresponding wearable device as the target terminal of information push (the information pushed-to terminal).

During specific implementation, the information push rule may be preset such that the target terminal is selected according to the rule and the service information or the service types of the wearable devices. Furthermore, service types of a mobile phone and service types of a wearable device may be classified into a communication type and a non-communication type. When the preset device information push rule is preferentially processing a service of a communication type (communication preferred for short, for example, the user is currently waiting for a call or an SMS message), if the service type of the service information received by the mobile phone is the communication type that includes a realtime communication type and a non-realtime communication type, a wearable device in the interaction state may be set as a most preferred target terminal, and a wearable device in the non-interaction state may be set as a second preferred target terminal, that is, the wearable device in the interaction state may be preferentially selected as the information pushed-to terminal. In this case, the wearable device in the interaction state may receive, at any time, the prompt information of the service information, and therefore, it takes a relatively short time to display the prompt information of the new service, and a user experience effect is good. If the wearable device is in the non-interaction state (such as the standby state), the device still needs to be started before the information is sent to the device, and therefore, it takes a relatively long time to display, on the device, the prompt information of the service information sent to the device, and the user experience effect is relatively poor. Furthermore, if the foregoing most preferred target terminal is not empty (that is, one or more devices of the wearable devices connected to the mobile phone are interacting with the user), one wearable device may be selected, from these wearable devices that meet the condition, as the target terminal of information push. If the foregoing most preferred target terminal is empty (that is, none of the wearable devices connected to the mobile phone is interacting with the user), one terminal may be selected from the second preferred target terminal as the target terminal of information push.

In addition, if the preset information push rule is preferentially processing a service of a non-communication type (communication not preferred for short, for example, the user is currently at rest and does not want to be disturbed by a communication service such as a call or an SMS message), when the service type of the service information received by the mobile phone is a communication type that includes a realtime communication type and a non-realtime communication type, a wearable device that is in the interaction state and whose service type is the communication type (that is, the same as the service type of the service information) may be set as a most preferred target terminal, a wearable device in the non-interaction state may be set as a second preferred target terminal, and a wearable device that is in the interaction state and whose service type is the non-communication type (such as a device on which a video is being played) may be set as a third preferred target terminal. That is, the wearable device that is in the interaction state and whose service type is the same as the service type of the service information may be preferentially selected from a terminal type as the information pushed-to terminal such that the prompt information of the service information is promptly pushed to the terminal, and other experience of the user is not affected. If there is no device that is among the wearable devices currently connected to the mobile phone and in the interaction state and whose service type is the communication type, the mobile phone may choose to send the prompt information of the service information to the wearable device in the non-interaction state. The current information push rule is communication not preferred. Therefore, the user may be watching a video or playing a game at the moment (the device is currently in the interaction state), and does not want to be disturbed. If the foregoing two types of devices are not included in the wearable devices connected to the mobile phone, the mobile phone then sends the prompt information of the service information to the wearable device that is in the interaction state and whose service type is the non-communication type.

During specific implementation, after receiving the service information, when selecting the information pushed-to terminal from multiple wearable devices connected to the mobile phone, the mobile phone may first filter out, according to the configuration information of the wearable devices connected to the mobile phone, a wearable device that does not support the service information received by the mobile phone, and select, from a wearable device that supports the service information, a wearable device that meets the requirement for pushing the service information. That is, the foregoing most preferred target terminal, second preferred target terminal, and third preferred target terminal are wearable devices that can support the service information received by the mobile phone.

During specific implementation, if the foregoing most preferred target terminal includes multiple wearable devices, when the information pushed-to terminal is being selected from the multiple wearable devices, one terminal may be selected as the information pushed-to terminal from the multiple wearable devices according to the service type of the service information and service types and configuration information of the wearable devices. If the foregoing second preferred target terminal includes multiple wearable devices, when the information pushed-to terminal is being selected from the multiple wearable devices, one device may be selected as the information pushed-to terminal from the multiple wearable devices according to configuration information of the wearable devices. If the foregoing third preferred target terminal includes multiple wearable devices, one device may be selected as the information pushed-to terminal from the multiple wearable devices according to configuration information of the wearable devices, where the foregoing configuration information mainly refers to the following: a device model of the wearable device, data transmission efficiency of the wearable device, whether a manner of communication between the wearable device and the mobile phone enables the prompt information of the service information to be sent or received more promptly and more efficiently, or the like. Furthermore, if there is more than one most preferred wearable device, when the information pushed-to terminal is being selected from the more than one most preferred wearable device, a wearable device on which a service the same as the service information runs may also be preferentially selected from the multiple wearable devices according to the service type of the service information, and the wearable device on which the service runs is selected as the information pushed-to terminal. In addition, if there is more than one wearable device that meets the condition, the information pushed-to terminal is selected from the more than one wearable device according to configuration information of the wearable devices. If there is no service that is the same as the service information, a wearable device whose service type is the same as the service type of the service information may be selected from the multiple wearable devices as the information pushed-to terminal. In addition, if there is more than one wearable device that meets the condition, the information pushed-to terminal may be selected from the more than one wearable device according to configuration information of the devices.

In some feasible implementation manners, after the information pushed-to terminal is selected according to the foregoing method, the prompt information of having received the service information by the mobile phone may be sent to the terminal to prompt the user of the mobile phone to promptly view the received service information. Further, the user may be prompted, in a prompt manner such as a flash of glasses, a ringtone of a watch, or vibration of smart shoes, to promptly view the information. The foregoing prompt manner is merely distance rather than exhaustive, and a prompt manner includes but is not limited to the foregoing manner.

In this embodiment of the present disclosure, wearable devices connected to a mobile phone may send configuration information and working status information of the wearable devices to the mobile phone, and may further update latest working status information to the mobile phone according to changes of working statuses of the wearable device. The mobile phone may select, from the wearable devices according to a service type of received service information, configuration information of the wearable devices connected to the mobile phone, and the working statuses of the wearable devices, one wearable deice as a target terminal of information push, send prompt information of having received the service information to the wearable device, and instruct, in a prompt manner such as a flash, a ringtone, or vibration of the wearable device, a user of the mobile phone to promptly view the service information, which can improve information push efficiency, improve utilization of the wearable device, ensure timeliness of reading the service information, and improve user experience of information push.

Figure 3:
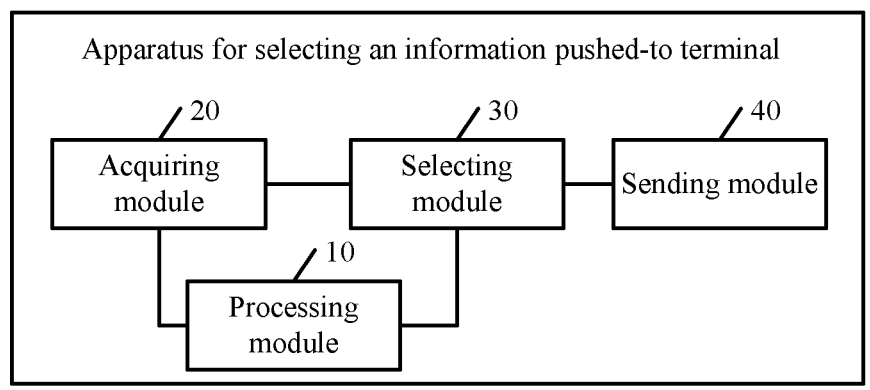
FIG. 3 is a schematic structural diagram of an embodiment of an apparatus for selecting an information pushed-to terminal according to an embodiment of the present disclosure.

Referring to FIG. 3, FIG. 3 is a schematic structural diagram of an embodiment of an apparatus for selecting an information pushed-to terminal according to an embodiment of the present disclosure. The apparatus for selecting an information pushed-to terminal in this embodiment includes a processing module 10 configured to determine a service type of received service information according to a preset terminal service type table, an acquiring module 20 configured to acquire, from a configured terminal status table, characteristic information of second terminals connected to the first terminal, where the processing module 10 is configured to determine working statuses of the second terminals according to the characteristic information acquired by the acquiring module, a selecting module 30 configured to select, from the second terminals according to a preset information push rule, the service type of the service information and the working statuses of the second terminals, a target terminal of information push, and a sending module 40 configured to send a prompt message of having received the service information to the target terminal.

Figure 4:
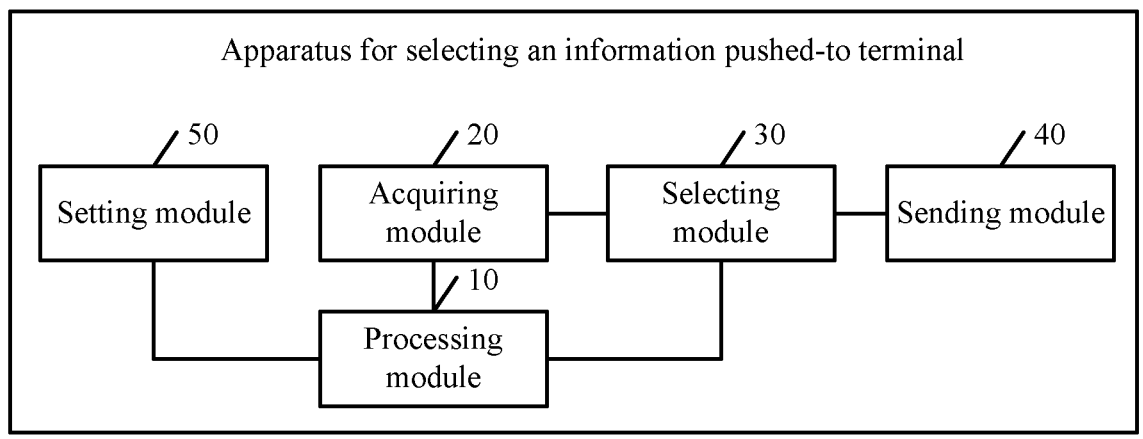
FIG. 4 is another schematic structural diagram of an embodiment of an apparatus for selecting an information pushed-to terminal according to an embodiment of the present disclosure.

In some feasible implementation manners, the apparatus (shown in FIG. 4) described in this embodiment further includes a setting module 50 configured to preset the terminal service type table, where the terminal service type table includes terminal service information, a terminal service type, and a correspondence between the terminal service information and the terminal service type.

During specific implementation, the apparatus for selecting an information pushed-to terminal in this embodiment of the present disclosure may be a mobile phone, a tablet computer, or the like, and may be corresponding to the first terminal in the embodiment of the method for selecting an information pushed-to terminal in the embodiments of the present disclosure. The foregoing apparatus is merely exemplary rather than exhaustive. The following uses a mobile phone as an example for specific description of the apparatus for selecting an information pushed-to terminal in this embodiment.

In some feasible implementation manners, the service information that is received by the mobile phone and described in this embodiment of the present disclosure may include voice or video call service information, an SMS message, an e-mail, instant messaging information, a push notification, and the like. The foregoing service information is merely exemplary rather than exhaustive.

During specific implementation, the terminal service type table may be preset on the mobile phone using the setting module 50 before the mobile phone receives the service information, where the terminal service type table may include the terminal service information, the terminal service type, and the correspondence between the terminal service information and the terminal service type. The foregoing terminal may be the first terminal (that is, the apparatus for selecting an information pushed-to terminal) described in this embodiment of the present disclosure or the second terminal, the foregoing terminal service information may include a voice or video call service, an SMS message, an e-mail, instant messaging information, a game, a video, navigation, and the like, and the foregoing terminal service type may include a realtime communication type, a non-realtime communication type, a realtime non-communication type, and the like. The setting module 50 may further preset the correspondence between the terminal service information and the terminal service type. For example, a voice or video call service is corresponding to the realtime communication type (that is, the voice or video call service may belong to the realtime communication type), an SMS message, an e-mail, and instant messaging information are corresponding to the non-realtime communication type, and a game and a video (such as a movie) are corresponding to the realtime non-communication type. In addition, a terminal service type corresponding to other service information, such as a terminal service type corresponding to navigation may further be included.

During specific implementation, after the setting module 50 sets the terminal service type table, when the mobile phone receives the service information, the processing module 10 may perform matching between the received service information and a service type in the foregoing terminal service type table to determine a service type corresponding to the received service information. After the processing module 10 determines the service type of the received service information, the target terminal of information push may be selected according to the service type of the service information and service types of wearable devices connected to the mobile phone in order to send, using the sending module 40, the prompt information of having received the service information to the terminal, where the foregoing target terminal of information push supports the service information received by the mobile phone, and a working status of the target terminal meets a requirement for pushing the service information. During specific implementation, for a specific implementation process in which the processing module determines the service type of the service information according to the terminal service table set by the setting module, reference may be made to step S101 in the embodiment of the method for selecting an information pushed-to terminal provided in the embodiment of the present disclosure, and details are not described herein again.

In some feasible implementation manners, the foregoing acquiring module 20 is further configured to acquire configuration information of the second terminals connected to the first terminal.

The foregoing processing module 10 is further configured to acquire communication data of the second terminals, determine the running statuses of the second terminals and service types of the second terminals according to the communication data, generate the terminal status table based on the configuration information, the running statuses, and the service types of the second terminals, and store the terminal status table in a designated location.

In some feasible implementation manners, the foregoing processing module 10 is further configured to determine whether there is data input or output on data input or output channels of the second terminals, and if it is determined that there is data input or output on a second terminal, determine that the second terminal is in an interaction state, and determine, according to acquired communication data, a type of a service running on the second terminal, or if it is determined that there is no data input or output on a second terminal, determine that the second terminal is in a non-interaction state.

During specific implementation, a second terminal described in this embodiment of the present disclosure may be a wearable device such as a head mounted display, GOOGLE GLASS, a smart watch, or smart shoes. The foregoing second terminal is merely exemplary rather than exhaustive.

In some feasible implementation manners, the characteristic information of the wearable devices (that is, the second terminals) in this embodiment may include the configuration information, the working statuses, and the like of the wearable devices, where the foregoing configuration information may include a device identifier, a device type, a manner of communication with the mobile phone, and the like, for example, an identification code of a wearable device, a device type of a wearable device (including a device model, data transmission efficiency of a device, a service type that can be supported by a device, and the like), and a manner of communication (such as BLUETOOTH transmission) between a wearable device and a mobile phone. A running status of the foregoing wearable device may include an interaction state or a non-interaction state. Furthermore, the foregoing interaction state may be classified into an active interaction state and a passive interaction state, where the active interaction state means that there is continuous data input on one or more data channels of a device, for example, a user continuously inputs data to one or more data channels of a device, such as voice, an image, or touch, and the passive interaction state means that there is continuous data output on one or more data channels of the device, for example, there is no input operation of the user, but the device outputs data to one or more data channels of the device, such as voice, an image, or touch. The non-interaction state means that there is no data input or output on a data channel of the user.

During specific implementation, when any wearable device (such as a smart watch) establishes a connection with the mobile phone, the mobile phone may acquire, using the acquiring module 20, configuration information of the smart watch, including an identifier, a device type, and the like that are of the smart watch. After the smart watch establishes a connection with the mobile phone, the mobile phone may detect a communication status of the smart watch in real time using the acquiring module 20, the acquiring module 20 may acquire communication data of the smart watch in real time, and the processing module 10 may determine a running status and a service type that are of the smart watch according to the communication data acquired by the acquiring module 20. Furthermore, the processing module 10 may determine, according to a data channel of the smart watch, whether there is data input or output on a data input or output channel of the smart watch, and if it is determined that there is data input or output on one or more data channels of the smart watch, may determine that the smart watch is in the interaction state, that is, the smart watch currently interacts with a user of the mobile phone, or if it is determined that there is no data input or output on the data channel of the smart watch, may determine that the smart watch is currently in the non-interaction state, that is, the smart watch may be currently in a standby state. In addition, when it is determined that the smart watch is in the interaction state, the processing module 10 may further determine, according to the acquired communication data, a type of a service currently running on the smart watch, for example, reading an SMS message or instant messaging information or playing a video. The foregoing data channel (including the data input channel and the data output channel) may include an input channel and an output channel of data or a signal, such as voice, an image, touch, or vibration.

During specific implementation, after acquiring, using the acquiring module 20, the configuration information of the wearable devices connected to the mobile phone, and determining, using the processing module 10, the running statuses of the wearable devices and the service types of the wearable devices, the mobile phone may generate the terminal status table based on the configuration information, the running statuses, and the service types of the wearable devices, and store the terminal status table in the designated location. After the mobile phone receives the service information and determines, using the processing module 10, the service type of the service information, the selecting module 30 may select, according to the characteristic information that is of the wearable devices and stored in the terminal status table, a corresponding wearable device as the information pushed-to terminal, and push, using the sending module 40, the prompt information of having received the service information to the device. During specific implementation, for a specific implementation process in which the processing module determines the working statuses of the devices according to the information acquired by the acquiring module, reference may be made to step S102 in the embodiment of the method for selecting an information pushed-to terminal in the embodiment of the present disclosure, and details are not described herein again.

In some feasible implementation manners, the information push rule is preferentially processing a service of a communication type, and the working status of the second terminal includes the running status of the second terminal and the service type of the second terminal.

The foregoing selecting module 30 is further configured to, if the service type of the service information is the communication type that includes a realtime communication type and a non-realtime communication type, set a second terminal in the interaction state as a most preferred target terminal, and set a second terminal in the non-interaction state as a second preferred target terminal, and determine whether the most preferred target terminal is empty, and if a result of the determining is not empty, select one terminal from the most preferred target terminal as the target terminal of information push, or if a result of the determining is empty, select one terminal from the second preferred target terminal as the target terminal of information push.

In some feasible implementation manners, after receiving the service information, when it is required to send the prompt information to the wearable device connected to the mobile phone, the mobile phone needs to select, according to a new service type and the characteristic information that is of the wearable devices and stored in the terminal status table, a corresponding wearable device as the target terminal of information push. During specific implementation, the information push rule may be preset such that the target terminal is selected according to the rule and the service information or the service types of the wearable devices. During specific implementation, service types of a mobile phone and service types of a wearable device may be classified into a communication type and a non-communication type. When the selecting module 30 learns that the preset device information push rule is preferentially processing the service of the communication type (communication preferred for short, for example, the user is currently waiting for a call or an SMS message), if the selecting module 30 determines that the service type of the service information received by the mobile phone is the communication type that includes the realtime communication type and the non-realtime communication type, the selecting module 30 may set a wearable device in the interaction state as the most preferred target terminal, and a wearable device in the non-interaction state may be set as the second preferred target terminal, that is, the selecting module 30 may preferentially select the wearable device in the interaction state as the information pushed-to terminal. In this case, the wearable device in the interaction state may receive, at any time, the prompt information of the service information, and therefore, it takes a relatively short time to display the prompt information of the new service, and a user experience effect is good. If the wearable device is in the non-interaction state (such as the standby state), the device still needs to be started before the information is sent to the device. Therefore, it takes a relatively long time to display, on the device, the prompt information of the service information sent to the device, and the user experience effect is relatively poor. Furthermore, if the foregoing most preferred target terminal is not empty (that is, there are one or more devices that are among the wearable devices connected to the mobile phone and interact with the user), the selecting module 30 may select, from these wearable devices that meet the condition, one wearable device as the target terminal of information push. If the foregoing most preferred target terminal is empty (that is, there is no device that is among the wearable devices connected to the mobile phone and interacts with the user), the selecting module 30 may select one terminal from the second preferred target terminal as the target terminal of information push.

In some feasible implementation manners, the information push rule is preferentially processing a service of a non-communication type, and the working status of the second terminal includes the running status of the second terminal and the service type of the second terminal.

The foregoing selecting module 30 is further configured to, if the service type of the service information is a communication type that includes a realtime communication type and a non-realtime communication type, set a second terminal that is in the interaction state and whose service type is a communication type as a most preferred target terminal, set a second terminal in the non-interaction state as a second preferred target terminal, and set a second terminal that is in the interaction state and whose service type is a non-communication type as a third preferred target terminal, and determine whether the most preferred target terminal is empty, and if the most preferred target terminal is not empty, select one terminal from the most preferred target terminal as the target terminal of information push, or if the most preferred target terminal is empty, determine whether the second preferred target terminal is empty, and if a result of the determining is not empty, select one terminal from the second preferred target terminal as the target terminal of information push, or if a result of the determining is empty, select one terminal from the third preferred target terminal as the target terminal of information push.

In addition, if the preset information push rule is preferentially processing the service of the non-communication type (communication not preferred for short, for example, the user is currently at rest and does not want to be disturbed by a communication service such as a call or an SMS message), when the service type of the service information received by the mobile phone is the communication type that includes the realtime communication type and the non-realtime communication type, the selecting module 30 may set a wearable device that is in the interaction state and whose service type is the communication type (that is, the same as the service type of the service information) as the most preferred target terminal, set a wearable device in the non-interaction state as the second preferred target terminal, and set a wearable device that is in the interaction state and whose service type is the non-communication type (such as a device on which a video is being played) as the third preferred target terminal. That is, the selecting module 30 may preferentially select, from a terminal type, the wearable device that is in the interaction state and whose service type is the same as the service type of the service information as the information pushed-to terminal such that the prompt information of the service information is promptly pushed to the terminal, and other experience of the user is not affected. If there is no device that is among the wearable devices currently connected to the mobile phone and in the interaction state and whose service type is the communication type, the selecting module 30 may choose to send the prompt information of the service information to the wearable device in the non-interaction state. The current information push rule is communication not preferred. Therefore, the user may be watching a video or playing a game at the moment (the device is currently in the interaction state), and does not want to be disturbed, if the foregoing two types of devices are not included in the wearable devices connected to the mobile phone, the selecting module 30 may then choose to send the prompt information of the service information to the wearable device that is in the interaction state and whose service type is the non-communication type.

During specific implementation, after the mobile phone receives the service information, when selecting the information pushed-to terminal from multiple wearable devices connected to the mobile phone, the selecting module 30 may first filter out, according to the configuration information of the wearable devices connected to the mobile phone, a wearable device that does not support the service information received by the mobile phone, and select, from a wearable device that supports the service information, a wearable device that meets the requirement for pushing the service information. That is, the foregoing most preferred target terminal, second preferred target terminal, and third preferred target terminal are wearable devices that can support the service information received by the mobile phone.

In some feasible implementation manners, the foregoing selecting module 30 is further configured to, if the most preferred target terminal includes multiple second terminals, select, according to the service type of the service information and service types and configuration information of the second terminals, one terminal from the multiple second terminals as the target terminal of information push, if the second preferred target terminal includes multiple second terminals, select, according to configuration information of the second terminals, one terminal from the multiple second terminals as the target terminal of information push, or if the third preferred target terminal includes multiple second terminals, select, according to configuration information of the third terminals, one terminal from the multiple third terminals as the target terminal of information push.

In some feasible implementation manners, when selecting, according to the service type of the service information and the service types and the configuration information of the second terminals, one terminal from the multiple second terminals as the target terminal of information push, the foregoing selecting module 30 is further configured to determine, according to a service type of each second terminal of the multiple second terminals, whether services running on the second terminals include a service that is the same as the service information, and if a result of the determining is that the services running on the second terminals include a service that is the same as the service information, select a second terminal on which the service runs, as the target terminal of information push, and if there are multiple second terminals on which the service runs, select, according to configuration information of the second terminals, one second terminal from the multiple second terminals as the target terminal of information push, or if a result of the determining is that the services running on the second terminals do not include a service that is the same as the service information, determine whether the service type of the second terminal includes a service type that is the same as the service type of the service information, if the service type of the second terminal includes a service type that is the same as the service type of the service information, select a second terminal corresponding to the service type as the target terminal of information push, and if there are multiple second terminals corresponding to the service type, select, according to configuration information of the second terminals, one second terminal from the multiple second terminals as the target terminal of information push.

During specific implementation, if the foregoing most preferred target terminal includes multiple wearable devices, when selecting, from the multiple wearable devices, the information pushed-to terminal, the selecting module 30 may select, from the multiple wearable devices according to the service type of the service information and service types and configuration information of the wearable devices, one terminal as the information pushed-to terminal. If the foregoing second preferred target terminal includes multiple wearable devices, when selecting the information pushed-to terminal from the multiple wearable devices, the selecting module 30 may select one device as the information pushed-to terminal from the multiple wearable devices according to configuration information of the wearable devices. If the foregoing third preferred target terminal includes multiple wearable devices, the selecting module 30 may select one device as the information pushed-to terminal from the multiple wearable devices according to configuration information of the wearable devices, where the foregoing configuration information mainly refers to the following: a device model of the wearable device, data transmission efficiency of the wearable device, whether a manner of communication between the wearable device and the mobile phone enables the prompt information of the service information to be sent or received more promptly and more efficiently, whether the wearable device supports the new service, or the like. Furthermore, if there is more than one most preferred wearable device, when selecting the information pushed-to terminal from the more than one most preferred wearable device, the selecting module 30 may also preferentially select, from the multiple wearable devices according to the service type of the service information, a wearable device on which a service the same as the service information runs, and select the wearable device on which the service runs as the information pushed-to terminal. In addition, if there is more than one wearable device that meets the condition, the selecting module 30 may select the information pushed-to terminal from the more than one wearable device according to configuration information of the wearable devices. If there is no service that is the same as the service information, the selecting module 30 may select, from the multiple wearable devices, a wearable device whose service type is the same as the service type of the service information as the information pushed-to terminal. In addition, if there is more than one wearable device that meets the condition, the selecting module 30 may select the information pushed-to terminal from the more than one wearable device according to configuration information of the devices.

In some feasible implementation manners, after the selecting module 30 selects the information pushed-to terminal, the sending module 40 may send the prompt information of having received the service information by the mobile phone to the terminal to prompt the user of the mobile phone to promptly view the service information. Further, the user may be prompted, in a prompt manner such as a flash of glasses, a ringtone of a watch, or vibration of smart shoes, to promptly view the information. The foregoing prompt manner is merely distance rather than exhaustive, and a prompt manner includes but is not limited to the foregoing manner. During specific implementation, for a specific implementation process in which the selecting module selects the information pushed-to terminal from the wearable devices, and sends, using the sending module, the prompt information of having received the service information to the terminal, reference may be made to step S103 in the embodiment of the method for selecting an information pushed-to terminal in the embodiment of the present disclosure, and details are not described herein again.

The apparatus for selecting an information pushed-to terminal in this embodiment of the present disclosure may select, from wearable devices according to a service type of service information received by a mobile phone, configuration information of the wearable devices connected to the mobile phone, and working statuses of the wearable device, one wearable device as a target terminal of information push, send prompt information of having received the service information to the wearable device, and instruct, in a prompt manner such as a flash, a ringtone, or vibration of the wearable device, a user of the mobile phone to promptly view the service information, which can improve information push efficiency, improve utilization of the wearable device, ensure timeliness of reading the service information, and improve a user experience effect of information push.

Figure 5:
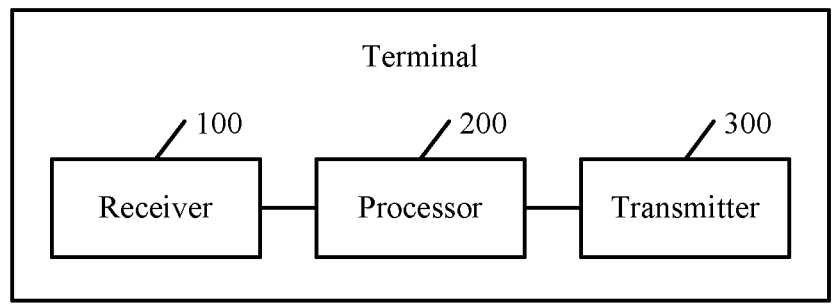
FIG. 5 is a schematic structural diagram of an embodiment of a terminal according to an embodiment of the present disclosure.

Referring to FIG. 5, FIG. 5 is a schematic structural diagram of an embodiment of a terminal according to an embodiment of the present disclosure. The terminal described in this embodiment includes a receiver 100 configured to receive service information, a processor 200 configured to determine, according to a preset terminal service type table, a service type of the service information received by the receiver, acquire, from a configured terminal status table, characteristic information of second terminals connected to the terminal, determine working statuses of the second terminals according to the characteristic information, select, from the second terminals according to a preset information push rule, the service type of the service information and the working statuses of the second terminals, a target terminal of information push, and a transmitter 300 configured to send a prompt message of having received the service information to the target terminal selected by the processor 200.

In some feasible implementation manners, the foregoing processor 200 is further configured to preset the terminal service type table, where the terminal service type table includes terminal service information, a terminal service type, and a correspondence between the terminal service information and the terminal service type.

During specific implementation, the terminal described in this embodiment of the present disclosure may be a mobile phone, a tablet computer, or the like, and may be corresponding to the first terminal in the embodiment of the method for selecting an information pushed-to terminal in the embodiments of the present disclosure. The foregoing terminal is merely exemplary rather than exhaustive. The following uses a mobile phone as an example for specific description of the terminal described in this embodiment.

In some feasible implementation manners, the service information that is received by the mobile phone and described in this embodiment of the present disclosure may include voice or video call service information, an SMS message, an e-mail, instant messaging information, a push notification, and the like. The foregoing service information is merely exemplary rather than exhaustive. During specific implementation, before the mobile phone receives the service information, the processor 200 may preset the terminal service type table on the mobile phone, where the terminal service type table may include the terminal service information, the terminal service type, and the correspondence between the terminal service information and the terminal service type. The foregoing terminal may include the first terminal (that is, the terminal described in this embodiment) in this embodiment of the present disclosure or the second terminal, the foregoing terminal service information may include a voice or video call service, an SMS message, an e-mail, instant messaging information, a game, a video, navigation, and the like, and the foregoing terminal service type may include a realtime communication type, a non-realtime communication type, a realtime non-communication type, and the like.

The processor 200 may further preset the correspondence between the terminal service information and the terminal service type. For example, a voice or video call service is corresponding to the realtime communication type (that is, the voice or video call service may belong to the realtime communication type), an SMS message, an e-mail, and instant messaging information are corresponding to the non-realtime communication type, and a game and a video (such as a movie) are corresponding to the realtime non-communication type. In addition, a terminal service type corresponding to other service information, such as a terminal service type corresponding to navigation may further be included. During specific implementation, after the processor 200 sets the terminal service type table, when the receiver 100 of the mobile phone receives the service information, the processor 200 may perform matching between the received service information and a service type in the foregoing terminal service type table to determine a service type corresponding to the received service information. After determining the service type of the received service information, the processor 200 may select, according to the service type of the service information and service types of wearable devices connected to the mobile phone, the target terminal of information push, and send, using the transmitter 300, the prompt information of having received the service information to the terminal, where the foregoing target terminal of information push supports the service information received by the mobile phone, and a working status of the target terminal meets a requirement for pushing the service information.

In some feasible implementation manners, the foregoing processor 200 is further configured to acquire configuration information of the second terminals connected to the terminal, acquire communication data of the second terminals, and determine running statuses of the second terminals and service types of the second terminals according to the communication data, and generate the terminal status table based on the configuration information, the running statuses, and the service types of the second terminals, and store the terminal status table in a designated location.

In some feasible implementation manners, the foregoing processor 200 is further configured to determine whether there is data input or output on data input or output channels of the second terminals, and if it is determined that there is data input or output on a second terminal, determine that the second terminal is in an interaction state, and determine, according to acquired communication data, a type of a service running on the second terminal, or if it is determined that there is no data input or output on a second terminal, determine that the second terminal is in a non-interaction state, where the data input or output channel includes at least one of data input or output channels of voice, an image, touch, and vibration.

During specific implementation, a second terminal described in this embodiment of the present disclosure may be a wearable device such as a head mounted display, GOOGLE GLASS, a smart watch, or smart shoes. The foregoing second terminal is merely exemplary rather than exhaustive.

In some feasible implementation manners, the characteristic information of the wearable devices (that is, the second terminals) in this embodiment may include the configuration information, the working statuses, and the like of the wearable devices, where the foregoing configuration information may include a device identifier, a device type, a manner of communication with the mobile phone, and the like, for example, an identification code of a wearable device, a device type of a wearable device (including a device model, data transmission efficiency of a device, a service type that can be supported by a device, and the like), and a manner of communication (such as BLUETOOTH transmission) between a wearable device and a mobile phone. A running status of the foregoing wearable device may include an interaction state or a non-interaction state. Furthermore, the foregoing interaction state may be classified into an active interaction state and a passive interaction state, where the active interaction state means that there is continuous data input on one or more data channels of a device, for example, a user continuously inputs data to one or more data channels of a device, such as voice, an image, or touch, and the passive interaction state means that there is continuous data output on one or more data channels of the device, for example, there is no input operation of the user, but the device outputs data to one or more data channels of the device, such as voice, an image, or touch. The non-interaction state means that there is no data input or output on a data channel of the user.

During specific implementation, when any wearable device (such as a smart watch) establishes a connection with the mobile phone, the processor 200 may acquire configuration information of the smart watch, including an identifier, a device type, and the like of the smart watch. After the smart watch establishes a connection with the mobile phone, the processor 200 may detect a communication status of the smart watch in real time, may acquire communication data of the smart watch in real time, and determines, according to the acquired communication data, a running status and a service type of the smart watch. Furthermore, the processor 200 may determine, according to a data channel of the smart watch, whether there is data input or output on a data input or output channel of the smart watch, and if it is determined that there is data input or output on one or more data channels of the smart watch, may determine that the smart watch is in the interaction state, that is, the smart watch currently interacts with a user of the mobile phone, or if it is determined that there is no data input or output on the data channel of the smart watch, may determine that the smart watch is currently in the non-interaction state, that is, the smart watch may be currently in a standby state. In addition, when it is determined that the smart watch is in the interaction state, the processor 200 may further determine, according to the acquired communication data, a type of a service currently running on the smart watch, for example, reading an SMS message or instant messaging information or playing a video. The foregoing data channel (including the data input channel and the data output channel) may include an input channel and an output channel of data or a signal, such as voice, an image, touch, or vibration. During specific implementation, after acquiring the configuration information of the wearable devices connected to the mobile phone and determining the running statuses of the wearable devices and the service types of the wearable devices, the processor 200 may generate the terminal status table based on the configuration information, the running statuses, and the service types of the wearable devices, and store the terminal status table in the designated location. After the receiver 100 receives the service information, the processor 200 may determine the service type of the service information according to the service information. After determining the service type of the service information, the processor 200 may select, according to the characteristic information of the wearable devices stored in the terminal status table, a corresponding wearable device as the information pushed-to terminal, and push, using the transmitter 300, the prompt information of having received the service information to the device.

In some feasible implementation manners, the information push rule is preferentially processing a service of a communication type, and the working status of the second terminal includes the running status of the second terminal and the service type of the second terminal.

The foregoing processor 200 is further configured to, if the service type of the service information is the communication type that includes a realtime communication type and a non-realtime communication type, set a second terminal in the interaction state as a most preferred target terminal, and set a second terminal in the non-interaction state as a second preferred target terminal, and determine whether the most preferred target terminal is empty, and if a result of the determining is not empty, select one terminal from the most preferred target terminal as the target terminal of information push, or if a result of the determining is empty, select one terminal from the second preferred target terminal as the target terminal of information push.

In some feasible implementation manners, after the receiver 100 of the mobile phone receives the service information, when it is required to send the prompt information to the wearable device connected to the mobile phone, the processor 200 needs to be used to select, according to a new service type and the characteristic information of the wearable devices stored in the terminal status table, a corresponding wearable device as the target terminal of information push. During specific implementation, the information push rule may be preset such that the processor 200 may select the target terminal according to the rule and the service information or the service types of the wearable devices. During specific implementation, service types of a mobile phone and service types of a wearable device may be classified into a communication type and a non-communication type. When the preset device information push rule is preferentially processing the service of the communication type (communication preferred for short, for example, the user is currently waiting for a call or an SMS message), if the processor 200 determines that the service type of the service information received by the mobile phone is the communication type that includes the realtime communication type and the non-realtime communication type, the processor 200 may set a wearable device in the interaction state as the most preferred target terminal, and set a wearable device in the non-interaction state as the second preferred target terminal, that is, the processor 200 may preferentially select the wearable device in the interaction state as the information pushed-to terminal. In this case, the wearable device in the interaction state may receive, at any time, the prompt information of the service information, and therefore, it takes a relatively short time to display the prompt information of the new service, and a user experience effect is good. If the wearable device is in the non-interaction state (such as the standby state), the device still needs to be started before the information is sent to the device, and therefore, it takes a relatively long time to display, on the device, the prompt information of the service information sent to the device, and the user experience effect is relatively poor. Furthermore, if the foregoing most preferred target terminal is not empty (that is, one or more devices of the wearable devices connected to the mobile phone are interacting with the user), the processor 200 may select, from these wearable devices that meet the condition, one wearable device as the target terminal of information push. If the foregoing most preferred target terminal is empty (that is, none of the wearable devices connected to the mobile phone and interacts with the user), the processor 200 may select one terminal from the second preferred target terminal as the target terminal of information push.

In some feasible implementation manners, the information push rule is preferentially processing a service of a non-communication type, and the working status of the second terminal includes the running status of the second terminal and the service type of the second terminal.

The foregoing processor 200 is further configured to, if the service type of the service information is a communication type that includes a realtime communication type and a non-realtime communication type, set a second terminal that is in the interaction state and whose service type is a communication type as a most preferred target terminal, set a second terminal in the non-interaction state as a second preferred target terminal, and set a second terminal that is in the interaction state and whose service type is a non-communication type as a third preferred target terminal, and determine whether the most preferred target terminal is empty, and if the most preferred target terminal is not empty, select one terminal from the most preferred target terminal as the target terminal of information push, or if the most preferred target terminal is empty, determine whether the second preferred target terminal is empty, and if a result of the determining is not empty, select one terminal from the second preferred target terminal as the target terminal of information push, or if a result of the determining is empty, select one terminal from the third preferred target terminal as the target terminal of information push.

In addition, if the preset information push rule is preferentially processing the service of the non-communication type (communication not preferred for short, for example, the user is currently at rest and does not want to be disturbed by a communication service such as a call or an SMS message), when the processor 200 determines that the service type of the service information received by the mobile phone is the communication type that includes the realtime communication type and the non-realtime communication type, the processor 200 may set a wearable device that is in the interaction state and whose service type is the communication type (that is, the same as the service type of the service information) as the most preferred target terminal, set a wearable device in the non-interaction state as the second preferred target terminal, and set a wearable device that is in the interaction state and whose service type is the non-communication type (such as a device on which a video is being played) as the third preferred target terminal. That is, the processor 200 may preferentially select, from a terminal type, the wearable device that is in the interaction state and whose service type is the same as the service type of the service information as the information pushed-to terminal such that the prompt information of the service information is promptly pushed to the terminal, and other experience of the user is not affected. If there is no device that is among the wearable devices currently connected to the mobile phone and in the interaction state and whose service type is the communication type, the processor 200 may choose to send the prompt information of the service information to the wearable device in the non-interaction state. The current information push rule is communication not preferred. Therefore, the user may be watching a video or playing a game at the moment (the device is currently in the interaction state), and does not want to be disturbed. If the foregoing two types of devices are not included in the wearable devices connected to the mobile phone, the processor 200 may then send the prompt information of the service information to the wearable device that is in the interaction state and whose service type is the non-communication type. During specific implementation, after the mobile phone receives the service information, when selecting the information pushed-to terminal from multiple wearable devices connected to the mobile phone, the processor 200 may first filter out, according to the configuration information of the wearable devices connected to the mobile phone, a wearable device that does not support the service information received by the mobile phone, and select, from a wearable device that supports the service information, a wearable device that meets the requirement for pushing the service information. That is, the foregoing most preferred target terminal, second preferred target terminal, and third preferred target terminal are wearable devices that can support the service information received by the mobile phone.

In some feasible implementation manners, the foregoing processor 200 is further configured to, if the most preferred target terminal includes multiple second terminals, select, according to the service type of the service information and service types and configuration information of the second terminals, one terminal from the multiple second terminals as the target terminal of information push, if the second preferred target terminal includes multiple second terminals, select, according to configuration information of the second terminals, one terminal from the multiple second terminals as the target terminal of information push, or if the third preferred target terminal includes multiple second terminals, select, according to configuration information of the third terminals, one terminal from the multiple third terminals as the target terminal of information push.

In some feasible implementation manners, the foregoing processor 200 is further configured to determine, according to a service type of each second terminal of the multiple second terminals, whether services running on the second terminals include a service that is the same as the service information, and if a result of the determining is that the services running on the second terminals include a service that is the same as the service information, select a second terminal on which the service runs, as the target terminal of information push, and if there are multiple second terminals on which the service runs, select, according to configuration information of the second terminals, one second terminal from the multiple second terminals as the target terminal of information push, or if a result of the determining is that the services running on the second terminals do not include a service that is the same as the service information, determine whether the service type of the second terminal includes a service type that is the same as the service type of the service information, if the service type of the second terminal includes a service type that is the same as the service type of the service information, select a second terminal corresponding to the service type as the target terminal of information push, and if there are multiple second terminals corresponding to the service type, select, according to configuration information of the second terminals, one second terminal from the multiple second terminals as the target terminal of information push.

During specific implementation, if the foregoing most preferred target terminal includes multiple wearable devices, when selecting the information pushed-to terminal from the multiple wearable devices, the processor 200 may select, from the multiple wearable devices according to the service type of the service information and service types and configuration information of the wearable device, one terminal as the information pushed-to terminal. If the foregoing second preferred target terminal includes multiple wearable devices, when selecting the information pushed-to terminal from the multiple wearable devices, the processor 200 may select one device as the information pushed-to terminal from the multiple wearable devices according to configuration information of the wearable devices. If the foregoing third preferred target terminal includes multiple wearable devices, the processor 200 may select one device as the information pushed-to terminal from the multiple wearable devices according to configuration information of the wearable devices, where the foregoing configuration information mainly refers to the following: a device model of the wearable device, data transmission efficiency of the wearable device, whether a manner of communication between the wearable device and the mobile phone enables the prompt information of the service information to be sent or received more promptly and more efficiently, whether the wearable device supports the new service, or the like. Furthermore, if there is more than one most preferred wearable device, when selecting the information pushed-to terminal from the more than one most preferred wearable device, the processor 200 may also preferentially select, from the multiple wearable devices according to the service type of the service information, a wearable device on which a service the same as the service information runs, and select the wearable device on which the service runs as the information pushed-to terminal. In addition, if there is more than one wearable device that meets the condition, the processor 200 selects the information pushed-to terminal from the more than one wearable device according to configuration information of the wearable devices. If there is no service that is the same as the service information, the processor 200 may select, from the multiple wearable devices, a wearable device whose service type is the same as the service type of the service information as the information pushed-to terminal. In addition, if there is more than one wearable device that meets the condition, the processor 200 may select the information pushed-to terminal from the more than one wearable device according to configuration information of the devices.

In some feasible implementation manners, after the processor 200 selects the information pushed-to terminal, the prompt information of having received the service information by the mobile phone may be sent to the terminal to prompt the user of the mobile phone to promptly view the service information. Furthermore, the user may be prompted, in a prompt manner such as a flash of glasses, a ringtone of a watch, or vibration of smart shoes, to promptly view the information. The foregoing prompt manner is merely distance rather than exhaustive, and a prompt manner includes but is not limited to the foregoing manner.

The terminal in this embodiment of the present disclosure may select, from wearable devices according to a service type of service information received by a mobile phone, configuration information of the wearable devices connected to the mobile phone, and working statuses of the wearable devices, one wearable device as a target terminal of information push, send prompt information of having received the service information to the wearable device, and instruct, in a prompt manner such as a flash, a ringtone, or vibration of the wearable device, a user of the mobile phone to promptly view the service information, which can improve information push efficiency, improve utilization of the wearable device, ensure timeliness of reading the service information, and improve a user experience effect of information push.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A method, comprising:
   receiving, by a first terminal, first information associated with a first application supported by the first terminal, wherein the first application is a first service type;
   receiving, by the first terminal, second information associated with a second application supported by the first terminal, wherein the second application is a second service type, and wherein the first service type and the second service type are different service types;
   detecting, by the first terminal, whether a first status of each of a plurality of second terminals comprises an interaction state or a non-interaction, state;
   selecting, from the plurality of second terminals, a second terminal that supports the first service type, does not support the second service type, and that is in the interaction state, wherein the interaction state represents that the second terminal interacts with the first terminal, wherein the non-interaction state represents that the second terminal is not interacting with the first terminal, wherein the second terminal is a wearable device, and wherein the first terminal is connected to the second terminal via a BLUETOOTH connection; and
   sending a first message to the second terminal when the first status belongs to the interaction state and the second terminal supports the first service type, wherein the first message corresponds to the first information associated with the first application, wherein the second information is not sent to the second terminal, and wherein the first message comprises prompt information indicating receipt of the first information.

2. The method of claim 1, wherein the first information comprises voice call information, video call information, a short message service (SMS) message, electronic mail (email), instant messaging information, or a push notification.

3. The method of claim 1, wherein the interaction state indicates that the second terminal is in contact with a user.

4. The method of claim 1, further comprising receiving support from the second terminal.

5. The method of claim 1, wherein the first message instructs the second terminal to display a first indication, and wherein the first indication prompts a user to check the first information on the first terminal.

6. An apparatus, comprising:
   a memory; and
   one or more processors coupled to the memory and configured to:
   receive first information associated with a first application supported by the apparatus, wherein the first application is a first service type;
   receive second information associated with a second application supported by the apparatus, wherein the second application is a second service type, and wherein the first service type and the second service type are different service types;
   detect whether a first status of each of a plurality of second terminals comprises an interaction state or a non-interaction state;
   select, from the plurality of second terminals, a second terminal that supports the first service type, does not support the second service type, and that is in the interaction state, wherein the interaction state represents that the second terminal interacts with the apparatus, wherein the non-interaction state represents that the second terminal is not interacting with the apparatus, wherein the second terminal is a wearable device, and wherein the apparatus is connected to the second terminal via a BLUETOOTH connection; and
   send a first message to the second terminal when the first status belongs to the interaction state and the second terminal supports the first service type, wherein the first message corresponds to the first information associated with the first application, wherein the second information is not sent to the second terminal, and wherein the first message comprises prompt information indicating receipt of the first information.

7. The apparatus of claim 6, wherein the first information comprises voice call information, video call information, a short message service (SMS) message, electronic mail (email), instant messaging information, or a push notification.

8. The apparatus of claim 6, wherein the interaction state indicates that the second terminal is in contact with a user.

9. The apparatus of claim 6, wherein the one or more processors are further configured to receive support from the second terminal.

10. The apparatus of claim 6, wherein the first message instructs the second terminal to display a first indication, and wherein the first indication prompts a user to check the first information on the apparatus.

11. A system, comprising:
    a first terminal configured to:
    connect to a second terminal via a BLUETOOTH connection;

receive a first information associated with a first application supported by the first terminal, wherein the first application is a first service type;

receive a second information associated with a second application supported by the first terminal, wherein the second application is a second service type, and wherein the first service type and the second service type are different service types;

detect whether a first status of each of a plurality of second terminals comprises an interaction state or a non-interaction state;

select one of the plurality of second terminals as the second terminal, wherein the second terminal supports the first service type, does not support the second service type, and that is in the interaction state, wherein the interaction state represents that the second terminal interacts with the first terminal, and wherein the non-interaction state represents that the second terminal is not interacting with the first terminal; and send a first message to the second terminal when the first status belongs to the interaction state and the second terminal supports the first service type, wherein the first message corresponds to the first information associated with the first application, wherein the second information is not sent to the second terminal, and wherein the first message comprises prompt information indicating receipt of the first information; and the second terminal comprising a wearable device and configured to:

receive the first message; and display, in response to the first message, a first indication prompting a user to check the first information on the first terminal.

12. The system of claim 11, wherein the first information comprise s voice call information, video call information, a short message service (SMS) message, electronic mail (email), instant messaging information, or a push notification.

13. The system of claim 11, wherein the interaction state indicates that the second terminal is in contact with the user.

14. The system of claim 11, wherein the second terminal is configured to support the first application.

15. The method of claim 1, wherein the first terminal comprises a phone.

16. The apparatus of claim 6, wherein the apparatus comprises a phone.

17. The system of claim 11, wherein the first terminal comprises a phone.

* * * * *

UNITED STATES PATENT AND TRADEMARK OFFICE
CERTIFICATE OF CORRECTION

PATENT NO. : 12,143,458 B2
APPLICATION NO. : 17/733189
DATED : November 12, 2024
INVENTOR(S) : Jingqing Mei and Zhihao Jin It is certified that error appears in the above-identified patent and that said Letters Patent is hereby corrected as shown below:

On the Title Page

(71) Applicant: "Huawei Device Co., Ltd., Guangdong (CN)" should read "Huawei Device Co., Ltd., Dongguan (CN)"

In the Claims

Claim 12, Column 38, Line 11: "comprise s voice call" should read "comprises voice call"

Signed and Sealed this
Twenty-fourth Day of December, 2024

Derrick Brent
*Acting Director of the United States Patent and Trademark Office*